(12) United States Patent
Cook

(10) Patent No.: US 8,935,989 B2
(45) Date of Patent: Jan. 20, 2015

(54) BACKLIT REFLECTIVE POINTER

(75) Inventor: David Cook, South Lyon, MI (US)

(73) Assignee: DENSO International America, Inc., Southfield, MI (US)

( * ) Notice: Subject to any disclaimer, the term of this patent is extended or adjusted under 35 U.S.C. 154(b) by 622 days.

(21) Appl. No.: 13/077,430

(22) Filed: Mar. 31, 2011

(65) Prior Publication Data

US 2012/0247385 A1 Oct. 4, 2012

(51) Int. Cl.
*G01D 13/22* (2006.01)

(52) U.S. Cl.
USPC .......................... 116/286; 116/288

(58) Field of Classification Search
CPC .............................. G01D 13/22; G01D 11/28
USPC ................. 116/286–288, 305, 328, 332, 334, 116/DIG. 6, DIG. 36; 362/26–30, 85
See application file for complete search history.

(56) References Cited

U.S. PATENT DOCUMENTS

| | | | | |
|---|---|---|---|---|
| 3,033,155 A * | 5/1962 | Beckman | ....................... | 116/288 |
| 3,559,616 A * | 2/1971 | Protzmann | ..................... | 116/332 |
| 4,380,043 A * | 4/1983 | Takamatsu et al. | ............. | 362/26 |
| 4,625,262 A * | 11/1986 | Sakakibara et al. | ............. | 362/26 |
| 5,103,385 A * | 4/1992 | Federico et al. | ............... | 362/298 |
| 5,320,062 A * | 6/1994 | Masuda et al. | ................... | 116/48 |
| 5,546,888 A * | 8/1996 | Skiver et al. | .................... | 116/286 |
| 5,797,345 A * | 8/1998 | Evans et al. | ..................... | 116/286 |
| 6,004,001 A * | 12/1999 | Noll | ................................ | 362/30 |
| 6,032,608 A * | 3/2000 | Oreans et al. | .................. | 116/288 |
| 6,302,551 B1 * | 10/2001 | Matumoto | ....................... | 362/27 |
| 6,379,015 B2 * | 4/2002 | Wilhelm et al. | ................. | 362/23 |
| 6,854,416 B2 * | 2/2005 | Breinich et al. | ............... | 116/202 |
| 6,981,464 B2 * | 1/2006 | Birman et al. | .................. | 116/288 |
| 7,270,434 B2 * | 9/2007 | Obata et al. | ...................... | 362/23 |
| 7,475,999 B2 * | 1/2009 | Mezouari | ......................... | 362/26 |
| 7,556,390 B2 * | 7/2009 | Takato | .............................. | 362/27 |
| 8,225,736 B2 * | 7/2012 | Cook | .............................. | 116/288 |
| 8,616,147 B2 * | 12/2013 | Wang et al. | ..................... | 116/288 |
| 2010/0186661 A1 | 7/2010 | Cook | | |

FOREIGN PATENT DOCUMENTS

| | | |
|---|---|---|
| JP | 2000-111366 | 4/2000 |
| JP | 2005-181017 | 7/2005 |
| JP | 2008-261664 | 10/2008 |

* cited by examiner

*Primary Examiner* — R. A. Smith
*Assistant Examiner* — Tania Courson
(74) *Attorney, Agent, or Firm* — Harness, Dickey & Pierce, P.L.C.

(57) ABSTRACT

A gauge assembly defining an interior direction and an exterior direction includes a gauge faceplate having a plurality of indicators and a hub that is substantially opaque. The hub includes a hub reflective portion that generally faces toward the interior direction. The assembly additionally includes a pointer having a first portion adjacent the hub and a second portion spaced away from the hub. The pointer is operable to move relative to the gauge faceplate such that the second portion distinguishes between the plurality of indicators. The pointer is substantially opaque, and the second portion includes a pointer reflective portion that generally faces toward the exterior direction. Moreover, the assembly includes a light source that emits a light generally in the exterior direction. The light reflects from the hub reflective portion generally toward the pointer reflective portion. The light also reflects from the pointer reflective portion generally toward the exterior direction.

29 Claims, 3 Drawing Sheets

BACKLIT REFLECTIVE POINTER

FIELD

The present disclosure relates to a pointer for a gauge assembly and, more particularly, to a backlight reflective pointer for a gauge assembly.

BACKGROUND

This section provides background information related to the present disclosure which is not necessarily prior art.

Instrument clusters on automobiles generally include numerous gauges for displaying operation information such as vehicle speed, engine RPM, engine coolant temperature, fuel tank level, and many other types of information. The gauges may include analog or digital displays for displaying the information depending on the gauge manufacturer and styling preferences. An analog gauge typically includes a faceplate having indicia or symbols (e.g., numerals, graduations, or other symbols) and a pointer for moving and pointing to one of the symbols. Thus, the pointer can distinguish the symbol from the others for indicating the corresponding condition of the vehicle. For instance, in the case of a speedometer, the faceplate can include thereon a number of numbers representing vehicle speeds, and the pointer can move relative to the faceplate until the pointer reaches the symbol corresponding to the actual vehicle speed. As such, the gauge can visually indicate the actual vehicle speed to the driver.

One important design consideration for an instrument cluster and related gauges is the ability of driver to quickly and easily view and read the gauges in all driving environments. For instance, gauges can include lights that emit light for illuminating the gauge.

SUMMARY

This section provides a general summary of the disclosure, and is not a comprehensive disclosure of its full scope or all of its features.

A gauge assembly defining an interior direction and an exterior direction is disclosed. The assembly includes a gauge faceplate having a plurality of indicators and a hub that is substantially opaque. The hub includes a hub reflective portion that generally faces toward the interior direction. The assembly additionally includes a pointer having a first portion adjacent the hub and a second portion spaced away from the hub. The pointer is operable to move relative to the gauge faceplate such that the second portion distinguishes between the plurality of indicators. The pointer is substantially opaque, and the second portion includes a pointer reflective portion that generally faces toward the exterior direction. Moreover, the assembly includes a light source that emits a light generally in the exterior direction. The light reflects from the hub reflective portion generally toward the pointer reflective portion. The light also reflects from the pointer reflective portion generally toward the exterior direction.

A vehicle instrument cluster gauge assembly defining an interior direction and an exterior direction is also disclosed. The assembly includes a circuit board and a gauge faceplate having a plurality of indicators and including an opening. The gauge faceplate has an exterior surface that extends in a transverse direction that is transverse to the exterior direction, and the gauge faceplate is at least partially translucent. Also, the hub has a substantially opaque first portion and a hub reflective portion that is removably coupled to the first portion. The hub reflective portion generally faces toward the interior direction, and the hub reflective portion includes a hub reflective surface that is disposed at a first acute angle relative to the exterior direction. Additionally, the assembly includes a pointer having a first portion that is fixed to the hub and a second portion that extends radially away from the hub and that is spaced away from the hub. The pointer is substantially opaque, and the second portion of the pointer includes a pointer reflective portion that generally faces toward the exterior direction. The pointer reflective portion includes a pointer reflective surface that is disposed at a second acute angle relative to the exterior direction. Furthermore, the assembly includes a stepper motor operable to drivingly rotate the pointer and the hub about an axis of rotation relative to the gauge faceplate such that the pointer distinguishes between the plurality of indicators. Moreover, the assembly includes a plurality of first light sources that are operably mounted to the circuit board and spaced apart about the axis of rotation. At least one of the plurality of first light sources is operable to emit a first light generally in the exterior direction through the opening and along an unobstructed passageway defined between the pointer and the hub. The first light reflects from the hub reflective portion toward the transverse direction and generally toward the pointer reflective portion, and the first light reflects from the pointer reflective portion generally toward the exterior direction. Also, the assembly includes a plurality of second light sources that are operably mounted to the circuit board. The second light sources are each operable to emit a second light generally in the exterior direction. The second light transmits through the gauge faceplate to at least partially illuminate the gauge faceplate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to FIGS. 1-3, which show exemplary embodiments of a gauge assembly 10 constructed according to various teachings of the present disclosure. The gauge assembly 10 can be suitable for use in an instrument cluster (i.e., included in a cluster of a plurality of gauges). Also, the gauge assembly 10 can be used in a vehicle, such as a car, truck, van, motorcycle, or other vehicle. However, the gauge assembly 10 can be used in any other machine without departing from the scope of the present disclosure. For purposes of discussion, the gauge assembly 10 will be discussed for use as a speedometer, for instance, for indicating the speed of a vehicle.

Figure 2:
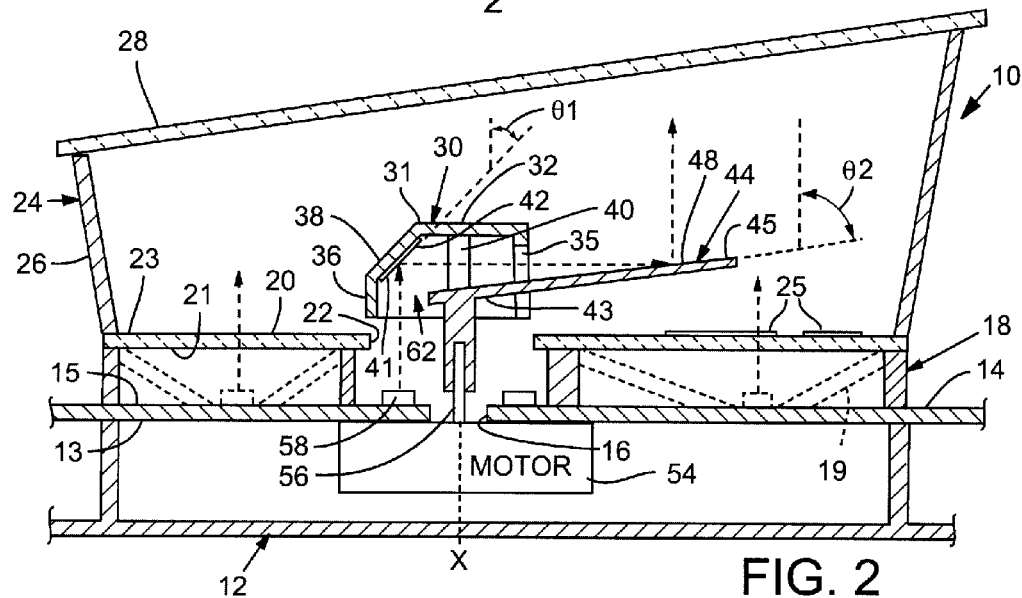
FIG. 2 is a section view of the gauge assembly taken along the line 2-2 of FIG. 1.

As shown in FIG. 2, the gauge assembly 10 can include a support structure 12. The support structure 12 can include various rigid and relatively strong parts. The support structure 12 can support other portions of the assembly 10 and can couple the gauge assembly 10 to other portions of the vehicle (e.g., the dashboard).

Furthermore, as shown in FIG. 2, the gauge assembly 10 can include a circuit board 14, such as a printed circuit board. The circuit board 14 can include many features of a known circuit board and can include various electronic equipment for controlling the gauge assembly 10. Also, the circuit board 14 can provide a means for mounting various other parts of the assembly 10 as will be discussed. The circuit board 14 can be relatively flat and can include an inner surface 13, an outer surface 15, and an opening 16 (e.g., a through-hole) extending between the inner and outer surfaces 13, 15.

The assembly 10 can additionally include one or more risers 18 as shown in FIG. 2. The risers 18 can be rigid and relatively strong members that extend away from the outer surface 15 of the circuit board 14. The risers 18 can include chimneys 19 (shown in phantom in FIG. 2) that extend at an acute angle relative to the outer surface 15 of the circuit board 14.

Figure 1:
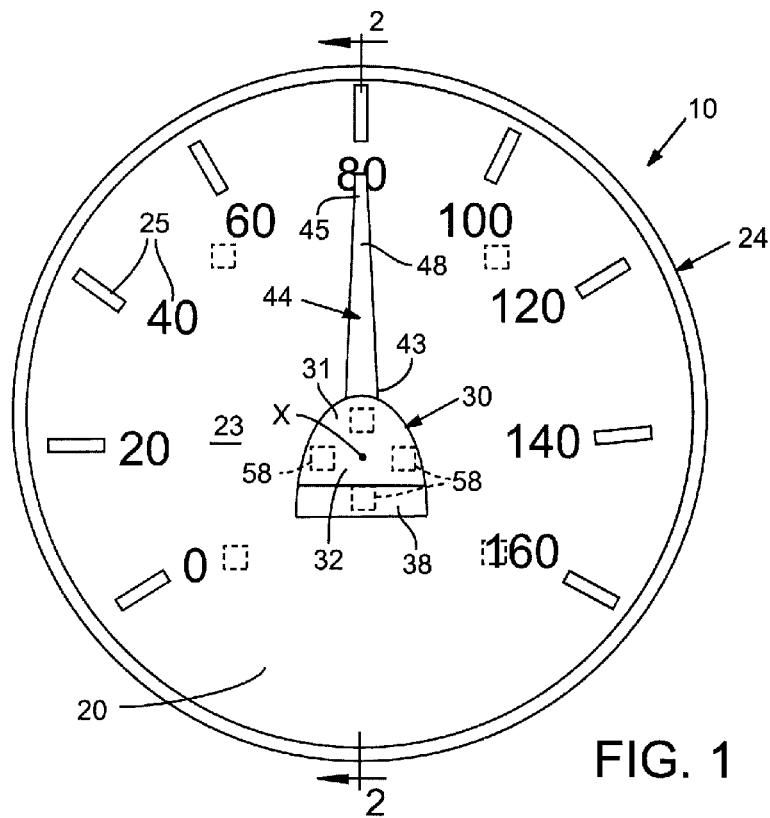
FIG. 1 is a top view of a gauge assembly according to the teachings of the present disclosure.

Moreover, as shown in FIGS. 1 and 2, the assembly 10 can include a gauge faceplate 20 (i.e., dial, appliqué, etc.). The gauge faceplate 20 can be substantially circular or otherwise rounded as shown in FIG. 1. The faceplate 20 can also be relatively flat, thin, and disc-shaped as shown in FIG. 2. Specifically, the faceplate 20 can include an interior surface 21, an exterior surface 23, and an opening (e.g., a through-hole) that extends between the interior and exterior surfaces 21, 23. The exterior surface 23 can define a "transverse direction," which will be discussed in detail below. The faceplate 20 can also include a plurality of indicators 25 (i.e., indicia). The indicators 25 can include various symbols, such as numbers, demarcating lines, etc. For instance, the indicators 25 can include a series of numbers representing different vehicle speeds and radially extending lines further demarcating the different vehicle speeds. The indicators 25 can be printed or otherwise included on the exterior surface 23. Also, in some embodiments, indicators 25 can be substantially opaque while the other portions of the faceplate 20 are translucent. In other embodiments, the indicators 25 can extend from the interior surface 21 to the exterior surface 23 of the faceplate 20, and the indicators 25 can be translucent while the other portions of the faceplate 20 are substantially opaque. Accordingly, as will be discussed, the faceplate 20 can be backlit such that the indicators 25 stand out from the other portions of the faceplate 20 so as to be visually apparent.

Still further, the assembly 10 can include a housing 24. The housing 24 can include a hollow tubular or frusto-conic side member 26 and a translucent or transparent cover 28. The housing 24 can be fixed to the faceplate 20. Together with the faceplate 20, the housing 24 can encapsulate other portions of the assembly 10 as will be discussed.

Figure 3:
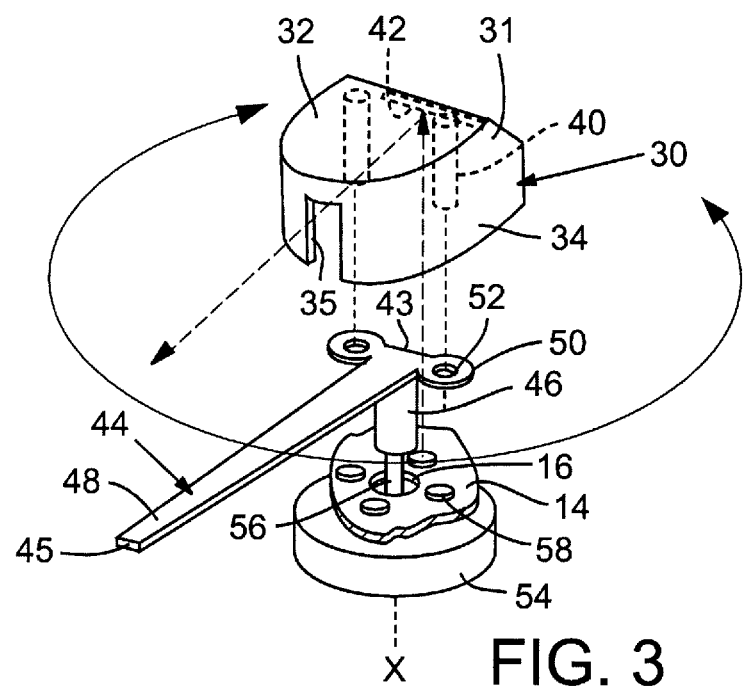
FIG. 3 is an isometric view of a portion of the gauge assembly of FIG. 1.

As shown in FIGS. 1, 2, and 3, the assembly can also include a hub 30. The hub 30 can be a thin-walled, hollow, box-shaped member that is made out of substantially opaque, polymeric material. Specifically, the hub 30 can include a first portion 31 having a substantially flat top wall 32 and a curved side wall 34 that extends away from the top wall 32 toward the faceplate 20. As best seen in FIG. 3, the side wall 34 can include a substantially rectangular notch 35 therein. Moreover, the hub 30 can include a first back wall 36 and a second back wall 38. The first and second back walls 36, 38 can each be substantially flat. The second back wall 38 can extend between the ends of the side wall 34. Moreover, the first back wall 36 can extend between the ends of the side wall 34 and can also extend downward toward the faceplate 20 from the second back wall 38. As shown in FIG. 2, the second back wall 38 can extend from the top wall 32 at an obtuse angle so as to be disposed at an acute angle relative to the faceplate 20. As such, the second back wall 38 generally faces the faceplate 20 (i.e., toward an interior direction of the assembly 10). Furthermore, the hub 30 can include one or more posts 40 as shown in FIG. 3. The posts 40 can extend from the top wall 32 toward the faceplate 20. The top wall 32, side wall 34, back walls 36, 38, and posts 40 can be integrally coupled together so as to be monolithic. It will be appreciated, however, that the hub 30 can have any suitable shape.

As shown in FIG. 2, the hub 30 can additionally include a hub reflective portion 42. The hub reflective portion 42 can be a substantially flat member made of reflective material (e.g., foil, mirror-type material, etc.) that is removably coupled to the second back wall 38. Also, in some embodiments, the reflective portion 42 is reflective material that is painted or otherwise applied to the second back wall 38. In additional embodiments, the second back wall 38 is integrally made from reflective material. In still additional embodiments, the reflective portion 42 can be contoured in shape.

Moreover, as shown in FIG. 2, the hub reflective portion 42 can include a hub reflective surface 41 that faces toward the faceplate 20 and toward an interior direction of the assembly 10. Furthermore, as shown in FIG. 2, the hub reflective surface 41 can be disposed at a first acute angle θ1 relative to an exterior direction defined by the gauge assembly 10.

The assembly 10 can additionally include a pointer 44 as shown in FIGS. 1, 2, and 3. The pointer 44 can be at least partially or wholly made out of a substantially opaque, polymeric material. The pointer 44 can include a first portion 43 and a second portion 45. The first portion 43 can be disposed adjacent the hub 30, and the second portion 45 can radially extend away from and can be spaced away from the hub 30. The base post 46 and the second portion 45 can be integrally coupled so as to be monolithic.

Specifically, as shown in FIGS. 2 and 3, the first portion 43 of the pointer 44 can include a tubular base post 46 that extends substantially perpendicular to the faceplate 20. The first portion 43 can also include a plurality (e.g., two) tabs 50 with holes 52 as shown in FIG. 3. Moreover, the second portion 45 can be elongate and axially straight and can extend radially away from the base post 46. As shown in FIG. 2, the second portion 45 can extend along in the transverse direction along the exterior surface 23 of the faceplate 20, wherein the distance between the exterior surface 23 and the second portion 45 gradually increases moving away from the base post 46. As such, as shown in FIG. 2, the outer surface of the second portion 45 can be disposed at a second acute angle θ2 relative to the exterior direction.

The second portion 45 can include a pointer reflective portion 48. The reflective portion 48 can include a reflective material (e.g., foil, mirror-like material, paint, dye, etc). In some embodiments, the reflective portion 48 can be removably connected to the other areas of the second portion 45, or the reflective portion 48 can be integrally connected to the second portion 45 so as to be monolithic. Also, the entire second portion 45 can be reflective, or only the area adjacent the terminal end of the second portion 45 can be reflective so as to define the pointer reflective portion 48.

As shown in FIG. 2, the assembly 10 can additionally include a motor 54. The motor 54 can be of any suitable type, such as a stepper motor of a known type. The motor 54 can include a shaft 56 that drivingly rotates about an axis of rotation X. The motor 54 can be operably mounted to the inner surface 13 of the circuit board 14, and the shaft 56 can extend through the opening 16 in the circuit board 14 and at least partially through the opening 22 in the faceplate 20.

The base post 46 of the pointer 44 can extend through the opening 22 in the faceplate 20 to receive and fix to the shaft 56 of the motor 54. As such, the motor 54 can drivingly rotate the pointer 44 about the axis of rotation X relative to the faceplate 20 to distinguish between the indicators 25 thereon. For instance, in the embodiments illustrated in FIG. 1, the pointer 44 has rotated about the axis X such that the second portion 45 partially overlaps and points at the "80" indicator 25 to thereby indicate that the vehicle is travelling eighty miles per hour.

The pointer 44 and the hub 30 can be coupled to move together relative to the gauge faceplate 20. For instance, as shown in FIGS. 2 and 3, the holes 52 in the tabs 50 of the pointer 44 can snap-fit with respective ones of the posts 40 such that the pointer 44 and hub 30 rotate about the axis X in tandem.

Moreover, the assembly 10 can include one or more light sources 58, 60 that provide illumination. For instance, the assembly 10 can include one or more first light sources 58 and one or more second light sources 60. The first and second light sources 58, 60 can be of any suitable type (e.g., light emitting diodes (LEDs)). The light sources 58, 60 can be fixed to the outer surface 15 of the circuit board 14, underneath the faceplate 20 and/or underneath the hub 30 and pointer 44 such that the light sources 58, 60 backlight the assembly. As such, the light sources 58, 60 can be fixed relative to the faceplate 20 and the hub 30 and pointer 44 can rotate relative to the light sources 58, 60.

The assembly 10 can include any number of first light sources 58. In the embodiments shown, there are four first light sources 58 that are substantially evenly spaced about the axis of rotation X, below the opening 22 in the faceplate 20. As such, the pointer 44 can rotate about the axis X and yet the second portion 45 of the pointer 44 can be disposed on opposite sides of the axis X. As will be discussed, the first light sources 58 can be operable to illuminate the pointer 44.

The assembly 10 can also include any number of second light sources 60. In the embodiments shown, there are four second light sources 60 spaced about the axis of rotation X. The second light sources 60 are disposed further away radially from the axis X than the first light sources 58. As shown in FIG. 2, the second light sources 60 can be disposed within respective ones of the chimneys 19. The chimneys 19 can include reflective material so as to reflect light from the second light sources 60 toward the faceplate 20.

In operation, the second light sources 60 can emit light generally outward (i.e., in the exterior direction) toward the viewer (e.g., the driver). This is represented by dotted arrows extending from the second light sources 60 in FIG. 2. Light from the second light sources 60 can travel through the translucent faceplate 20 to backlight the faceplate 20. As stated above, the indicators 25 can be opaque while the other portions of the faceplate 20 are translucent, or vice versa, such that the light from the second light sources 60 makes the indicators 25 stand out visually.

Moreover, as shown in FIG. 2, at least one of the first light sources 58 can emit light in the exterior direction, through the opening 22 in the faceplate 20 and generally toward the hub reflective portion 42. This light is reflected from the hub reflective portion 42 (e.g., approximately at a ninety degree angle) toward the transverse direction (e.g., substantially parallel to the exterior surface 23 of the faceplate 20) and generally toward the pointer reflective portion 48. This light is then reflected from the outer surface (i.e., the reflective surface) of the pointer reflective portion 48 (e.g., approximately at a ninety degree angle) generally toward the exterior direction and toward the viewer (e.g., the driver). (Light from the first sources 58 is represented by dotted arrows in FIG. 2.) Accordingly, the first light source(s) 58 can illuminate the pointer 44.

Thus, the pointer 44 and the gauge faceplate 20 can be independently lit to allow for color separation and staged lighting. Also, the first light sources 58 can emit light of a different color than that of the second light sources 60 to further visually distinguish the faceplate 20 and the pointer 44. Accordingly, the gauge assembly 10 can be highly visible in various light conditions.

It will be appreciated that the number and/or position of first light sources 58 can be adapted such that light from at least one of the first light sources 58 will be able to reflect off of the hub reflective portion 42 to illuminate the pointer 44. For instance, each of the first light sources 58 can emit light that reflects off of the hub reflective portion 42 toward the pointer 44. In other embodiments, only some of the first light sources 58 emits light, depending on the angular position of the pointer 44.

Also, it will be appreciated that the width of the hub 30 can be sufficient to hide the first light sources 58, regardless of the angular position of the pointer 44. Accordingly, light is unlikely to leak directly to the viewer (e.g., driver) from the first light sources 58.

It will also be appreciated that the pointer reflective portion 48 and/or the path of the light from the first light sources 58 can be adapted to illuminate any portion of the pointer 44. For instance, in some embodiments, only the terminal end (i.e., free end) of the second portion 45 of the pointer 44 is illuminated by the first light sources 58. In other embodiments, substantially all of the outer surface of the second portion 45 is illuminated by the first light sources 58.

Also, it will be appreciated that the light from the first light sources 58 can travel along an unobstructed pathway 62 (FIG. 2) defined by the opening 22 in the faceplate 20 and defined between the hub 30 and the pointer 44. The light from the first light sources 58 can travel along the unobstructed pathway 62 from the first light sources 58, to the hub reflective portion 42, out of the hub 30 through the notch 35, and to the pointer reflective portion 42. Accordingly, the intensity of the light from the first light sources 58 is unlikely to be significantly reduced before reaching the viewer, and the pointer 44 is likely to be highly visible.

Moreover, it will be appreciated that the pointer 44 can have any suitable width. For instance, the second portion 45 of the pointer 44 can be substantially thin and needle-like without substantially reducing its visibility. This can be very aesthetically appealing for the viewer (e.g., driver).

Figure 6:
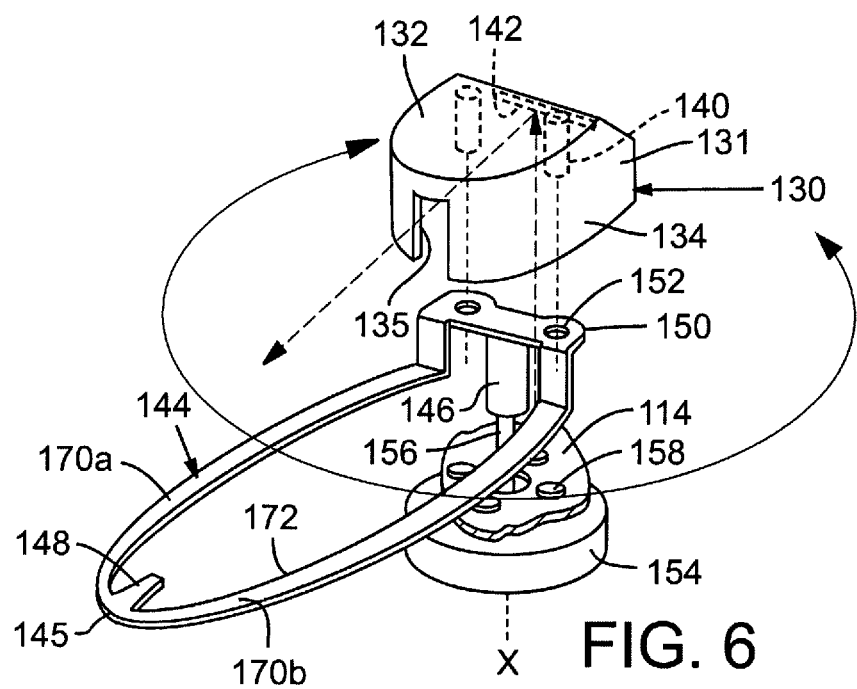
FIG. 6 is an isometric view of a portion of the gauge assembly of FIG. 4.
Figure 4:
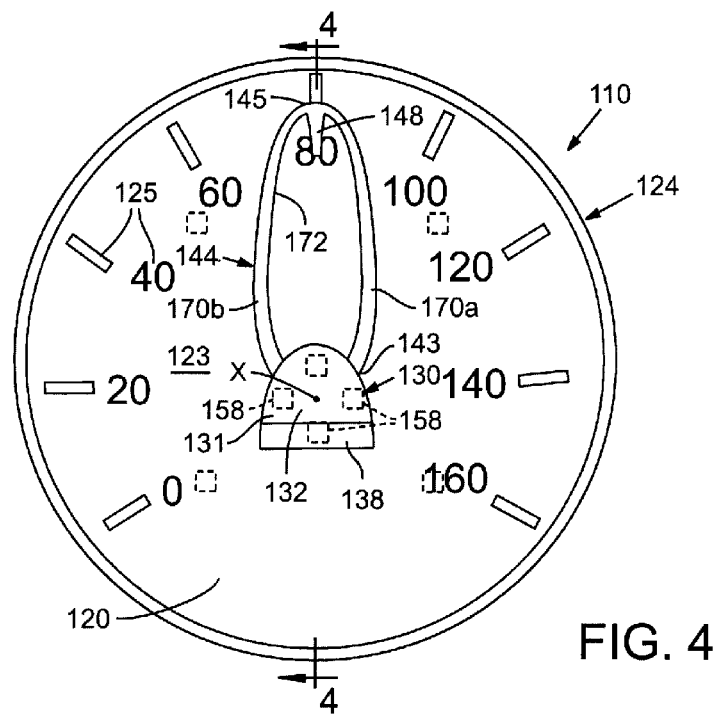
FIG. 4 is a top view of a gauge assembly according to additional teachings of the present disclosure.
Figure 5:
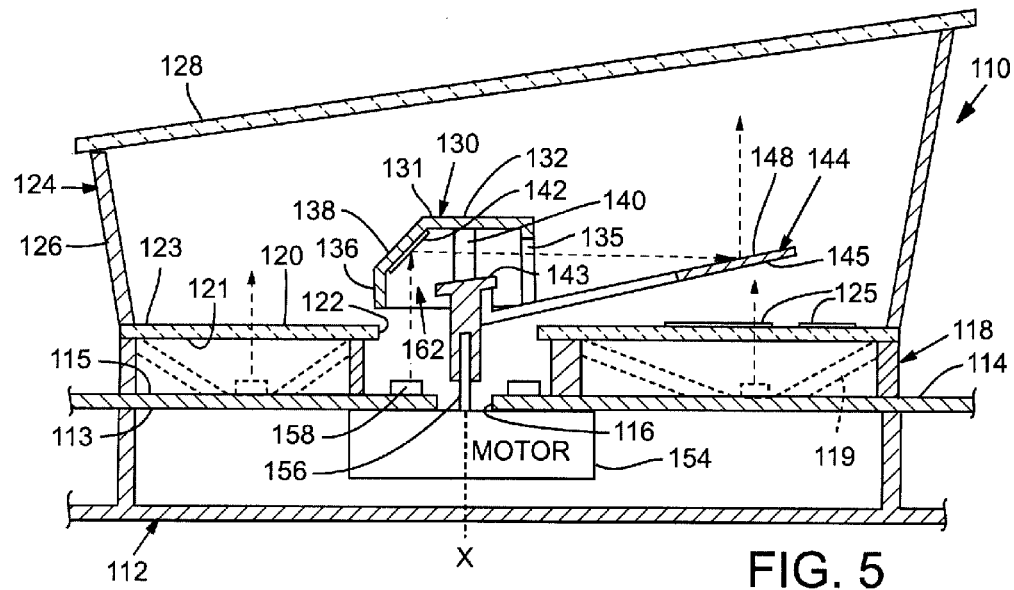
FIG. 5 is a section view of the gauge assembly taken along the line 5-5 of FIG. 4.

Referring now to FIGS. 4-6, a gauge assembly 110 is illustrated according to additional teachings of the present disclosure. Components of the assembly 110 that correspond to those of the embodiments of FIGS. 1-3 are indicated with corresponding reference numbers increased by 100.

The assembly 110 is substantially similar to the embodiments of FIGS. 1-3. However, the second portion 45 of the pointer 144 includes a first arm 170a and a second arm 170b. The arms 170a, 170b are each elongate and have a curved longitudinal axis. On one end, each arm 170a, 170b can be fixed to a respective one of the tabs 150, and on the opposite end, each arm 170a, 170b can be fixed to opposite sides of the pointer reflective portion 148. The pointer reflective portion 148 can be short and rectangular, and can be fixed to the arms 170a, 170b to extend inward radially toward the first portion 143 of the pointer 144.

As shown in FIGS. 4 and 6, an opening 172 can be defined between the arms 170a, 170b, the pointer reflective portion 148, and the hub 130. Also, as shown in FIG. 4, the faceplate 120 can be visible through the opening 172. In fact, one or more of the indicators 125 can be visible through the opening 172. Thus, the pointer 144 can distinguish between the indicators 125 both by partially overlapping one of the indicators 125 (e.g., the "80" in FIG. 4) and by allowing that indicator 125 to be seen through the opening 172.

Thus, the assembly 10, 110 of the present disclosure can be illuminated in a highly visible manner. Also, the assembly 10, 110 can be very aesthetically pleasing.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A gauge assembly defining an interior direction and an exterior direction comprising:
a gauge faceplate having a plurality of indicators;
a hub that is substantially opaque, the hub including a hub reflective portion that generally faces toward the interior direction;
a pointer having a first portion adjacent the hub and a second portion spaced away from the hub, the pointer operable to move relative to the gauge faceplate such that the second portion distinguishes between the plurality of indicators, the pointer being a solid opaque member, the second portion including a flat planar pointer reflective portion that generally faces toward the exterior direction; and
a light source that emits a light generally in the exterior direction, the light reflecting from the hub reflective portion generally toward the pointer reflective surface, the light reflecting from the flat planar pointer reflective portion generally toward the exterior direction; wherein
the light source emits light through an opening in the gauge faceplate to travel along an unobstructed pathway from the hub reflective portion to the pointer reflective surface of the pointer; and
the pointer is a flat planar member defining the flat planar pointer reflective portion.

2. The gauge assembly of claim 1, wherein the hub and pointer are coupled to move together relative to the gauge faceplate.

3. The gauge assembly of claim 1, wherein the light source is fixed relative to the gauge faceplate, and wherein the pointer is operable to move relative to the light source.

4. The gauge assembly of claim 3, wherein the light source is one of a plurality of first light sources, the plurality of first light sources each operable to emit a first light generally in the exterior direction, the first light reflecting from the hub reflective portion generally toward the flat planar pointer reflective portion, the first light reflecting from the flat planar pointer reflective portion generally toward the exterior direction, wherein the pointer is operable to rotate about an axis of rotation relative to each of the plurality of first light sources, and wherein the plurality of first light sources are spaced apart about the axis of rotation.

5. The gauge assembly of claim 1, wherein the light source is a first light source and further comprising a second light source that emits a second light that at least partially illuminates the gauge faceplate.

6. The gauge assembly of claim 5, wherein the first light source and second light source emit different color lights.

7. The gauge assembly of claim 5, wherein the gauge faceplate is at least partially translucent, and wherein the second light emits the second light generally in the exterior direction and through the gauge faceplate to at least partially illuminate the gauge faceplate.

8. The gauge assembly of claim 1, further comprising a circuit board, wherein the light source is operably mounted to the circuit board, wherein the gauge faceplate includes an opening, and wherein the light source is operable to emit the light generally in the exterior direction through the opening, the light reflecting from the hub reflective portion generally toward the flat planar pointer reflective portion, the light reflecting from the flat planar pointer reflective portion generally toward the exterior direction.

9. The gauge assembly of claim 8, further comprising a motor operable to drivingly rotate the pointer in rotation relative to the gauge faceplate, the motor including a shaft and the pointer including a base, the shaft being operably coupled to the base, at least one of the base and the shaft extending through the opening.

10. The gauge assembly of claim 1, wherein the pointer is operable to rotate about an axis of rotation relative to the gauge faceplate to distinguish between the plurality of indicators, the second portion of the pointer and the light source being disposed on opposite sides of the axis of rotation.

11. The gauge assembly of claim 1, wherein the pointer includes a plurality of arms, wherein an opening is defined between the plurality of arms, the flat planar pointer reflective portion, and the hub, wherein the gauge faceplate is viewable through the opening.

12. The gauge assembly of claim 1, wherein the hub includes a first portion, and wherein the hub reflective portion is removably coupled to the first portion of the hub.

13. The gauge assembly of claim 1, wherein the light source emits a light generally in the exterior direction, the light reflecting from the hub reflective portion, generally in a transverse direction along an exterior surface of the gauge faceplate and generally toward the flat planar pointer reflective portion, the light reflecting from the flat planar pointer reflective portion generally toward the exterior direction.

14. The gauge assembly of claim 1, wherein the hub reflective portion includes a hub reflective surface that is disposed at an acute angle relative to the exterior direction and the flat planar pointer reflective portion includes a flat planar pointer reflective surface that is disposed at an acute angle with respect to the exterior direction.

15. The gauge assembly of claim 1, wherein the flat planar pointer reflective portion is disposed at an acute angle relative to the exterior direction.

16. The gauge assembly of claim 1, wherein an unobstructed passageway is defined between the hub and the pointer, the light travelling along the unobstructed passageway from the light source, to the hub reflective portion, and along the unobstructed passageway out from the hub toward the flat planar pointer reflective portion.

17. The gauge assembly of claim 1, wherein the flat planar pointer reflective surface is an outer surface of the pointer.

18. The gauge assembly of claim 1, wherein the light emitted by the light source does not travel through the pointer.

19. The gauge assembly of claim 1, wherein the entire pointer is a solid opaque member.

20. The gauge assembly of claim 1, wherein only the flat planar pointer reflective surface is illuminated by the light source.

21. The gauge assembly of claim 1, wherein the hub includes a top wall and a side wall extending from the top wall towards the gauge faceplate, the side wall defining a notch through which the pointer extends.

22. The gauge assembly of claim 1, wherein the flat planar pointer reflective surface extends from an end of the pointer opposite to the hub towards the hub.

23. A vehicle instrument cluster gauge assembly defining an interior direction and an exterior direction comprising:
   a circuit board;
   a gauge faceplate having a plurality of indicators and including an opening, the gauge faceplate having an exterior surface that extends in a transverse direction that is transverse to the exterior direction, the gauge faceplate being at least partially translucent;
   a hub having a substantially opaque first portion and a hub reflective portion that is removably coupled to the first portion, the hub reflective portion generally facing toward the interior direction, the hub reflective portion including a hub reflective surface that is disposed at a first acute angle relative to the exterior direction;
   a pointer having a first portion that is fixed to the hub and a second portion that extends radially away from the hub and that is spaced away from the hub, the pointer being a solid opaque member, the second portion of the pointer including a flat planar pointer reflective surface that generally faces toward the exterior direction, the flat planar pointer reflective surface being disposed at a second acute angle relative to the exterior direction;
   a stepper motor operable to drivingly rotate the pointer and the hub about an axis of rotation relative to the gauge faceplate such that the pointer distinguishes between the plurality of indicators;
   a plurality of first light sources that are operably mounted to the circuit board and spaced apart about the axis of rotation, at least one of the plurality of first light sources operable to emit a first light generally in the exterior direction through the opening and along an unobstructed passageway defined between the pointer and the hub, the first light reflecting from the hub reflective portion toward the transverse direction and generally toward the flat planar pointer reflective surface, the first light reflecting from the flat planar pointer reflective surface generally toward the exterior direction; and
   a plurality of second light sources that are operably mounted to the circuit board, the plurality of second light sources each operable to emit a second light generally in the exterior direction, the second light transmitting through the gauge faceplate to at least partially illuminate the gauge faceplate; wherein
   the light source emits light through an opening in the gauge faceplate to travel along an unobstructed pathway from the hub reflective portion to the flat planar pointer reflective surface of the pointer; and
   the pointer is a flat planar member defining the flat planar pointer reflective surface.

24. The gauge assembly of claim 23, wherein the flat planar pointer reflective surface is an outer surface of the pointer.

25. The gauge assembly of claim 23, wherein the light emitted by the light source does not travel through the pointer.

26. The gauge assembly of claim 23, wherein the entire pointer is a solid opaque member.

27. The gauge assembly of claim 23, wherein only the flat planar pointer reflective surface is illuminated by the light source.

28. The gauge assembly of claim 23, wherein the hub includes a top wall and a side wall extending from the top wall towards the gauge faceplate, the side wall defining a notch through which the pointer extends.

29. The gauge assembly of claim 23, wherein the flat planar pointer reflective surface extends from an end of the pointer opposite to the hub towards the hub.

* * * * *